United States Patent
Gillespie

[19]

[11] Patent Number: 6,014,377
[45] Date of Patent: Jan. 11, 2000

[54] SYSTEM AND METHOD FOR AN INTEGRATED WIRELINE/WIRELESS SERVICE USING PRIVATE BRANCH EXCHANGE LINES

[75] Inventor: Donald E. Gillespie, Boulder, Colo.

[73] Assignee: US West, Inc., Denver, Colo.

[21] Appl. No.: 09/129,563

[22] Filed: Aug. 5, 1998

[51] Int. Cl.[7] .................................................. H04Q 7/22
[52] U.S. Cl. ........................ 370/351; 370/310; 455/417; 455/445; 455/461; 379/210
[58] Field of Search .................... 370/351, 310, 370/328; 455/403, 414, 417, 445, 422, 461; 379/58, 67, 57, 56, 63, 210, 211, 212, 213, 214, 142, 88, 201, 207, 229

[56] References Cited

U.S. PATENT DOCUMENTS

| | | |
|---|---|---|
| 5,422,943 | 6/1995 | Cooney et al. . |
| 5,440,613 | 8/1995 | Fuentes . |
| 5,457,736 | 10/1995 | Cain et al. . |
| 5,506,887 | 4/1996 | Emery et al. . |
| 5,579,379 | 11/1996 | D'Amico et al. ........................ 379/112 |
| 5,594,777 | 1/1997 | Makkonen et al. . |
| 5,657,375 | 8/1997 | Connolly et al. . |
| 5,664,005 | 9/1997 | Emery et al. . |
| 5,677,942 | 10/1997 | Meier . |
| 5,742,668 | 4/1998 | Pepe et al. ................................. 379/58 |
| 5,742,905 | 4/1998 | Pepe et al. ................................ 455/461 |
| 5,742,906 | 4/1998 | Foladare et al. . |
| 5,758,281 | 5/1998 | Emery et al. ............................ 455/428 |
| 5,805,997 | 9/1998 | Farris ...................................... 455/461 |
| 5,890,063 | 3/1999 | Mills ....................................... 455/433 |
| 5,920,820 | 7/1999 | Qureshi et al. .......................... 455/461 |

*Primary Examiner*—Ajit Patel
*Attorney, Agent, or Firm*—Brooks & Kushman

[57] ABSTRACT

A method and system for routing a call incoming to a Private Branch Exchange (PBX) network telephone number from outside of the PBX network based on a PBX subscriber's location includes routing the call to a wireline switch which detects predetermined PBX triggers. Also included is generating a query at the switch for receipt by the wireline service control point (SCP) upon detecting the PBX triggers. The query requests mobile registration status data which corresponds to the PBX number. Also included is routing the call from the switch to a PBX switch for delivery to a PBX handset corresponding to the PBX number, which is in response to the PBX's subscriber mobile registration data indicating that the PBX subscriber is not wireless registered. Further included is generating a mobile query at the SCP to a Home Location Register (HLR) of the wireless network in response to the mobile registration status data indicating that the subscriber is wireless registered. The mobile query requests a current subscriber mobile location and wireless routing destination number. Also included is communicating a wireless routing destination number from the HLR to the SCP. Also included is generating a message to the switch from the SCP that the call is to be routed to the wireless network. The call is routed from the switch to the wireless network which in turn routes the call to the wireless routing destination number.

20 Claims, 3 Drawing Sheets

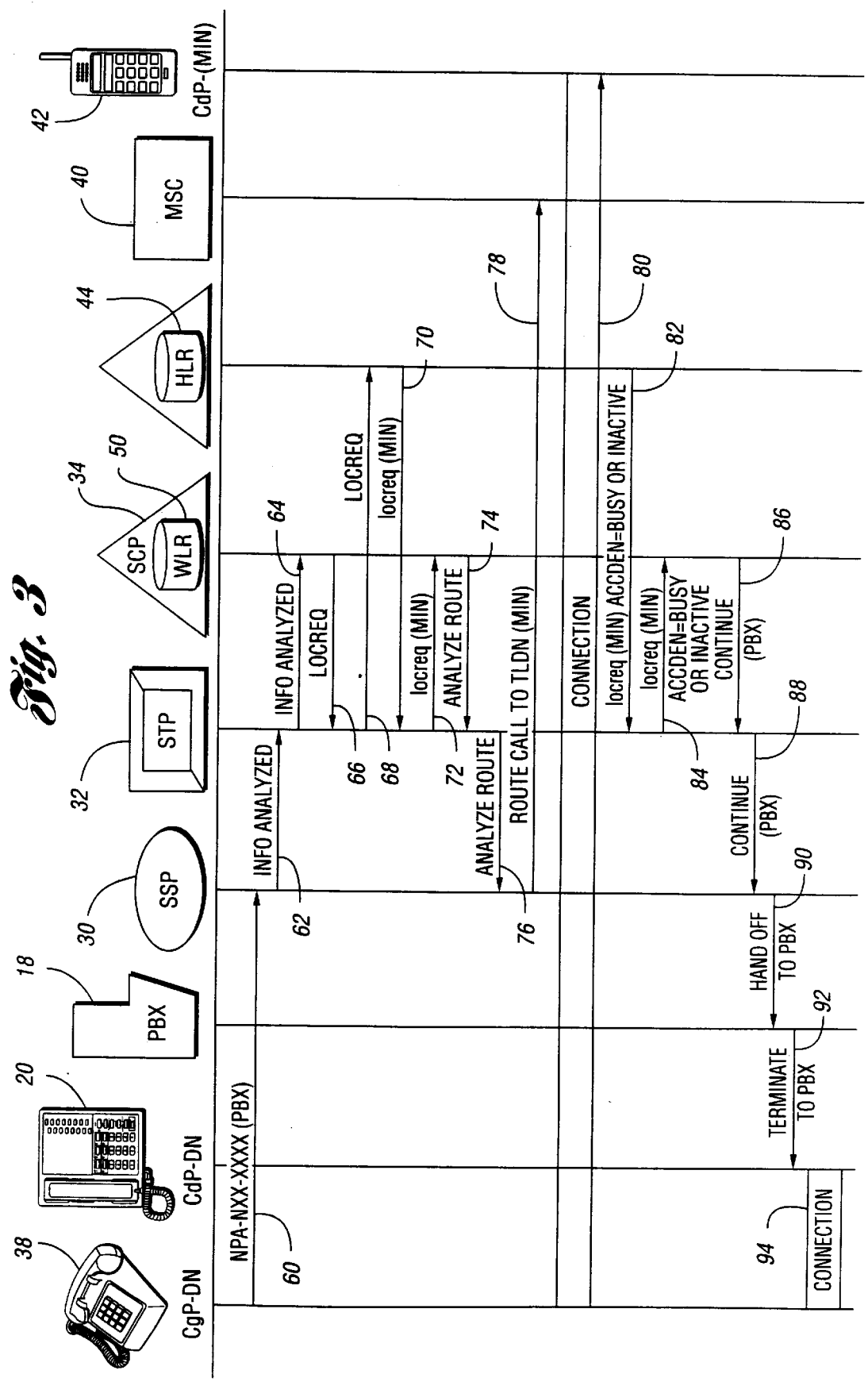

SYSTEM AND METHOD FOR AN INTEGRATED WIRELINE/WIRELESS SERVICE USING PRIVATE BRANCH EXCHANGE LINES

TECHNICAL FIELD

This invention relates to a system and method for an integrated wireless-wireline network for serving the Private Branch Exchange (PBX) network.

BACKGROUND ART

A private branch exchange (PBX) is a privately operated network which typically services the stations of a single business unit or other entity, for example a corporation or university campus. The PBX is connected via a direct inward dial (DID) trunk to a switching system of the wireline network. The PBX itself is a private self-regulated switching element that commonly provides its users/subscribers with features like those found in public networks. Calls that are made to a PBX station from the public wireline network, such as the Public Switched Telephone Network (PSTN), are routed to a "Class 5" switch serving that PBX. The Class 5 switch routes the calls over PBX trunks to the PBX for termination to the stations served by the PBX. When a PBX user originates a call to the PSTN, the user typically dials an access digit such as "9" and the called party's telephone number. The call is then forwarded to the Class 5 switch in the PSTN for termination to the called party. Internal calls among stations served by the PBX are processed internally to the PBX. The PBX is also capable of providing such features as abbreviated dialing, call forwarding, call transfer, etc., to the PBX stations.

In the PBX architecture, equipment is available to the business customer allowing it to provide wireless access to its users. A Class 5 switch, such as a Service Switching Point (SSP), serves a PBX via a plurality of PBX trunks. PBX allows users to use a PBX extension telephone.

Currently, because the PBX network is a privately operated system, it is not served by either the public wireline or wireless networks. Likewise, the PBX cannot access the services available to subscribers in the public wireline and wireless networks, nor does the PBX have access to the public network's AIN architecture capabilities. Moreover, once a call is handed off to the PBX network, there is little opportunity to hand it back to the public network for processing.

This lack of interworking capability between private, wireline and wireless systems introduces several drawbacks. These drawbacks include the lack of call handling provisions for calls directed from the public wireline and wireless networks to private networks such as PBX. As PBX networks become more common as these business units seek a cost-savings by operating their own communication systems, PBX networks are not capable of providing or accommodating services that presently exist among and between public wireline networks and wireless networks.

Consequently, a need has developed for a system and method which provides for an integrated wireline-wireless services which utilizes PBX lines and provides the capability for calls directed to PBX networks to be processed via the public networks prior to their handoff to the PBX network.

SUMMARY OF THE INVENTION

It is another object according to the present invention to provide a system and method for providing an interface between the wireline and wireless communication networks utilizing private branch exchange lines.

It is a further object according to the present invention to provide a system and method for providing a single-number service between the wireline and wireless communication networks for private branch exchange lines.

It is still another object according to the present invention to provide a system and method for providing the PBX user and/or subscriber with the perception and appearance of a single hybrid wireline-wireless-PBX service.

It is yet another object according to the present invention for providing a single PBX-number service through which a PBX subscriber or user can be reached by a calling party dialing a single PBX-number assigned to the subscriber, regardless of the PBX subscriber's location in the PBX wireless network.

It is yet still a further object according to the present invention to provide a single-number call routing service adapted for use with an internetwork interface having mapping and address routing capabilities for routing a call to a wireless number (MIN), whenever the single PBX-number subscriber is registered within the wireless domain.

It is yet still another object according to the present invention to provide a method and system which is further adapted for use in cooperation with existing private branch exchange lines in a PBX network so as to minimize the need for additional network components.

In carrying out these and other objects and goals according to the present invention a method is disclosed for routing a call directed to a PBX subscriber's single Private Branch Exchange (PBX) network telephone number from outside of the PBX network based on the PBX subscriber's location in the PBX or wireless networks. The method includes the procedures of routing the call to a wireline switch in order to detect any predetermined PBX triggers that may be attached to the call. The method further includes generating a query at the wireline switch for receipt by the wireline service control point (SCP) upon detecting the predetermined PBX triggers whereby the query requests mobile registration status data corresponding to the single PBX number.

Also included is routing the call from the wireline switch to a PBX switch in the PBX network for delivery to the single PBX number in response to the PBX's subscriber mobile registration data indicating that the PBX subscriber is not wireless registered. Further, the method calls for generating a mobile query at the wireline service control point to the Home Location Register (HLR) of the wireless network in response to the subscriber mobile registration status data indicating that the subscriber is wireless registered, whereby the mobile query requests a current subscriber mobile location and wireless routing destination number. Also included is communicating a wireless routing destination number from the HLR to the wireline SCP, and generating a message to the wireline switch from the wireline SCP that the call is to be routed to the wireless network. Further, the method calls for routing the call from the wireline switch to the wireless network which in turn routes the call to the wireless routing destination number.

In a preferred embodiment according to the teachings of the present invention, the method includes storing the PBX's subscriber's mobile registration data in a database which is in communication with the wireline SCP and generating a query by the wireline SCP to the database requesting the PBX subscriber's mobile registration data.

A system according to the present invention is also disclosed herein. This system provides a call routing service for calls directed to a single Private Branch Exchange (PBX) number through a wireline switch to either a wireless handset in the wireless network corresponding to the single-PBX-number or to a PBX extension in the PBX network assigned to the single-PBX-number. An embodiment of the system may include a Wireline Location Register (WLR) which is a database located in the wireline network (preferably within or in communication with the SCP) which is in electrical communication with the wireline switch for storing single-PBX-number routing information and registration status data. Also included is a Home Location Register (HLR) which is located in the wireless network and which is in electrical communication with the WLR for storing and communicating to the WLR single-PBX-number routing information and registration status data. Also included in the system is a service control point (SCP) located in the wireline network which is in communication with the WLR and the wireline switch. The SCP is operable to retrieve the single-PBX-number routing information from the WLR and also to provide the single-PBX-number routing information to the wireline switch.

In a preferred embodiment according to the above system, further included therein is a signal transfer point (STP) which is located in the wireline network and which is in communication with the SCP, HLR and wireline switch operable to act as a gateway to forward communications between the HLR and SCP and the wireline switch and the SCP.

The above objects and other objects, features and advantages of the present invention are readily apparent from the following detailed description of the best modes for carrying out the invention when taken in connection with the accompanying drawings wherein like reference numerals correspond to like components.

BRIEF DESCRIPTION OF THE DRAWINGS

FIG. 3 is a call flow diagram according to the present invention illustrating calls to directed to a PBX subscriber.

BEST MODE FOR CARRYING OUT THE INVENTION

Figure 1:
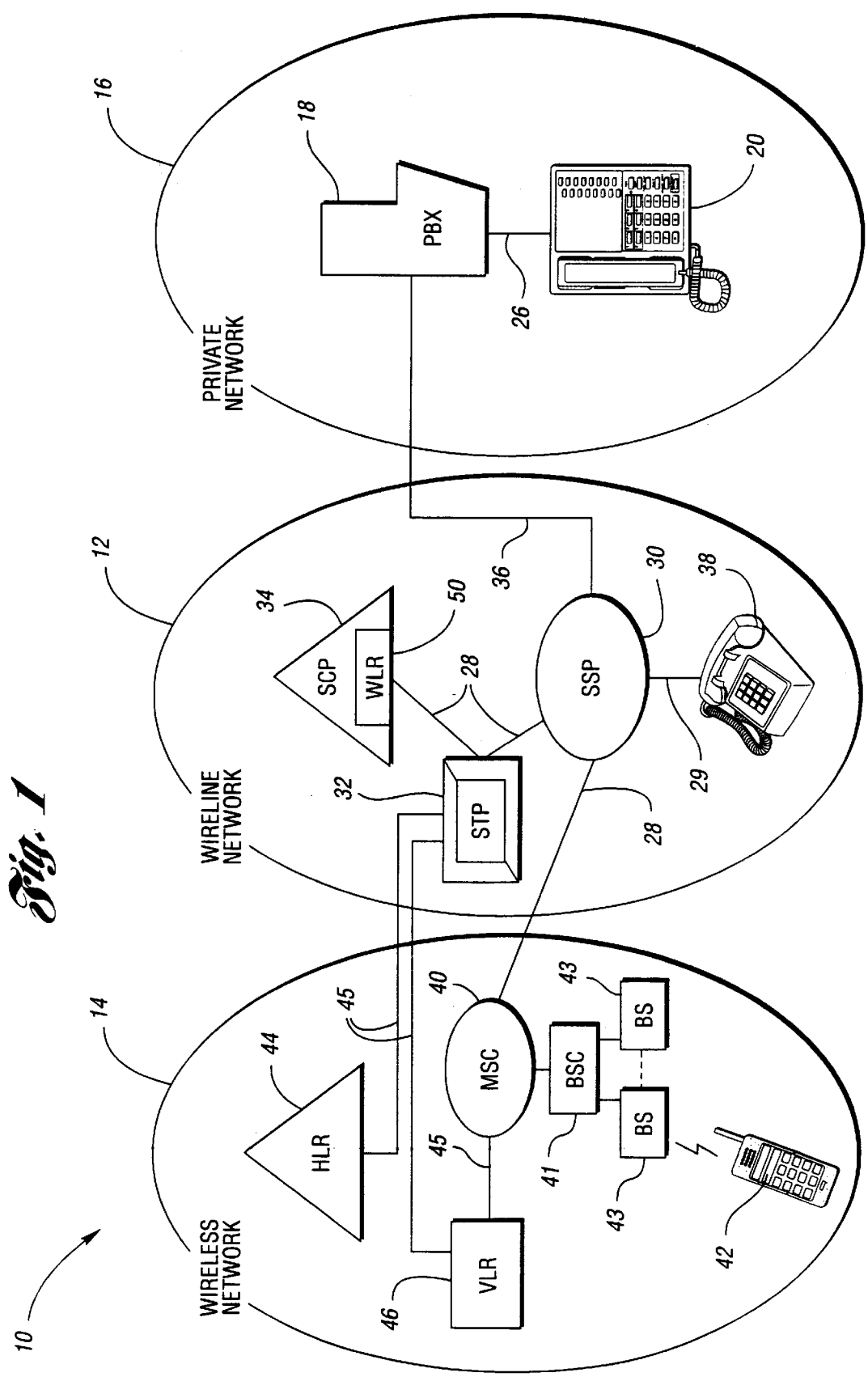
FIG. 1 is a schematic diagram of a system according to the present invention for providing an integrated wireline-wireless service using private branch exchange lines.

With reference to FIG. 1 of the drawings, there is provided a schematic diagram of an integrated wireline-wireless-PBX network system 10 according to the present invention. System 10 includes a wireline network portion 12, a wireless network portion 14, and a private branch exchange network (PBX) portion 16.

PBX portion 16 includes a PBX switch 18 and at least one private base station 44. PBX switch 18 is responsible for providing features associated with subscriber lines to its users, including but not limited to abbreviated dialing, call waiting, three-way calling, call forwarding and call transfer. PBX switch 18 enables a user to receive or originate calls from a PBX desktop station 20 (extension) in PBX network portion 16.

The public network includes a wireline portion 12 and a wireless portion 14. Wireline portion 12 is a telecommunications network consisting of a number of switches and application processors interconnected by transmission circuits. Wireline network portion 12 is otherwise known in the art as an Advanced Intelligent Network (AIN) for use in a wireline Public Switched Telephone Network (PSTN). AIN is known to those skilled in the art to permit subscriber services to be extended throughout the wireline network. Specifically, wireline network 12 is utilized for updating the subscriber service profile which contains subscriber specific data regarding how calls should be handled.

Further, as those skilled in the art will recognize, network 12 is implemented with a Common Channel Signaling (CCS) protocol 28, such a Common Channel Signaling System No. 7 (hereinafter referred to as "SS7 protocol".) SS7 protocol is an out-of-band signaling path comprised of various packet switching elements 32 and transmission signaling links 28, some of which are shown in wireline network 12. Common Channel Signaling, such as Signaling System No. 7 (SS7), is a signaling method in which a signaling channel conveys, by means of labeled messages, signaling information relating to call setup, control, network management, and network maintenance. The SS7 network exists within the telecommunications network and controls it. SS7 achieves this control by creating and transferring call processing, network management and maintenance messages to the network's various components.

An SS7 network has three distinct components, Service Switching Points (SSPs) 30, Signal Transfer Points (STPs) 32, and Service Control Points (SCPs) 34. SCP 34 contains centralized network databases for providing enhanced services. SCP 34 accepts queries from SSP 30 and returns the requested information to the originator of the query.

SSP 30 is a telephone switch, or Class 5 switch, which performs call processing on calls that originate, tandem, or terminate at that site. SSP 30 is known as a digital telephone exchange which controls the switching between the wireline network and mobile cell sites from all wireline-to-mobile, mobile-to-wireline, and mobile-to-mobile calls. SSP 30 also serves the PBX network by transferring calls directed to the PBX switch 18 via PBX trunks 36, which are direct inward dia (DID) trunks, of the type such as primary rate interface (PRI) trunks, T-1 lines, copper-pair, and others as are known in the art.

SSP 30 is generally a node or a wireline switch which is provided in electrical communication with CPE 38 through the PSTN. SSP 30 is in an AIN capable switch. SSP 30 recognizes the predetermined AIN "triggers" used when a subscriber or user invokes a subscriber service. More particularly, in the present invention, SSP 30 recognizes the triggers associated with a calling party dialing a private branch exchange (PBX) line number designated as a single PBX-number. SSP 30 further communicates with SCP 34 (discussed herein) to operate the service. The electrical communication between CPE 38 and SSP 30 is made via a twisted copper pair 29, as is commonly known. As shown generally in FIG. 1, SSP 30 is further provided in electrical communication with SCP 34 via Signal Transfer Points (STP) 32 and signaling links 28.

STP's are packet switches used to route signaling messages within a wireline network 12 as well as route call routing instructions to SSP 30. In still other embodiments, features such as Intelligent Peripherals (not shown) which is well known in the art may also be incorporated in wireline network 12 without any change to the spirit or scope of the present invention. A Service Control Point (SCP) 34 is incorporate as shown in FIG. 1 and as further discussed below.

SCP 34 is a node which contains the service logic and associated data support needed to execute required customer and subscriber services such as the single-number PBX service of the present invention. The service logic contained in SCP 34 includes a service profile for each subscriber or subscription service. Service logic stored in SCP 34 is accessible to each predetermined SSP 30 in the telephone system or network. In one embodiment, SCP 34 is further provided in electrical communication with a Wireline Location Register (WLR) 50 database more fully disclosed herein. Preferably, WLR 50 is located within SCP 34.

As is more fully set forth in FIG. 1, the Customer Premises Equipment (CPE) device of the caller is represented and designated as telephone 38. However, it is clear that the CPE may include a data modem, a facsimile machine, a voice messaging peripheral, or any other telecommunications equipment that may receive or transmit voice or data. As those skilled in the art will recognize, in operation, each telephone 38 is provided in electrical communication with Service Switching Point (SSP) 30.

Wireless network portion 14 includes features for processing calls between the respective communications protocols of wireline network 12 and wireless network 14. Processing is achieved through wireline 12 features SCP 34 and STP 32 and wireless network 14 features such as the Mobile Switching Center (MSC) 40, Home Location Register (HLR) 44, and Visitor Location Register (VLR) 46. MSC 40 oversees base stations 43 and controllers 41 which manage each of the radio channels assigned to its coverage area.

With further reference to FIG. 1, the wireless network portion 14 of system 10 is generally known in the art to include four basic components: a cell site having a base station controller 41 and base station radio transceiver 43; system interconnections; and mobile handsets or units. Mobile Switching Center (MSC) 40 (or Mobile Telephone Switching Center (MTSC)) is known to those skilled in the art as a digital telephone exchange which controls the switching between the PSTN and mobile cell sites for all wireline-to-mobile, mobile-to-wireline, and mobile-to-mobile calls. In operation, when MSC 40 receives a call from the PSTN which is directed to a mobile identification number (MIN), MSC 40 deciphers the telephone number dialed by the wireline user and alerts the controllers 41 or base stations 43 at all cell sites to page a corresponding mobile handset 42. Similarly, when the mobile handset 42 places a call, MSC 40 accepts the dialing data from the cell site controller and dials the desired number for transmission to the PSTN. MSC 40 also processes mobile registration status data received from the cell site controller 41, switches calls to other cells, processes diagnostic information, and compiles mobile billing statistics.

Typical wireless networks 14 include multiple adjoining cells each of which includes at least one cell site controller 41 which operates under the direction of MSC 40. The cell site controller 41 manages each of the radio channels at the site, supervises calls, turns the radio transmitter and receivers on and off, injects data onto the control and user channels, and performs diagnostic tests on the cell site equipment. Cells may includes multiple radio transmitters and radio receivers. As those skilled in the art will further recognize, in operation multiple receivers are generally tuned to the same frequency. However, the receiver which locates the stronger radio signal is continuously selected. Furthermore, cells typically have at least one radio channel that transmits control data to and receives control data from the mobile units. This control data advises the mobile unit that a call is coming from the MSC 40 or conversely, advises the controller 41 that a mobile telephone user desires to place a call. To complete the connection, the controller 41 uses the control channel to advise the mobile unit when user channel had been assigned to the call.

MSC 40 of wireless network 14 is analogous in functionality to SSP 30 of wireline network 12. MSC 40 also retrieves all necessary data to respond to subscriber call requests from the Home Location Register (HLR) 44 and the Visitor Location Register (VLR) 46, each discussed more fully herein. In turn, MSC 40 provides databases HLR 44 and VLR 46 with updated information on subscriber mobile registration status and location. To register a subscriber in wireless network 12, MSC 40 ascertains when a PBX subscriber is present in the wireless network 14 when the PBX subscriber places a call via mobile unit 42, or by automatic registration. Specifically, each time mobile unit 42 is powered on or a call is originated from mobile unit 42, certain information is transmitted to MSC 40, including the unit's Mobile Identification Number (MIN), Electronic Serial Number (ESN) and system identification (SID).

The Home Location Register (HLR) 44 is a master database for storing data related to each mobile subscriber, such as the subscriber profile and mobility information together with their relevant permanent (static) data, such as access capabilities and subscriber services. In addition, HLR 44 is in electrical communication with and provides MSC 40 with information about the MSC 40 service area where the mobile unit 42 is actually located (temporary or dynamic data) to allow incoming calls to be routed immediately to the called subscriber's mobile unit 42.

The Visitor Location Register (VLR) 46 is a functional element which corresponds to one or several MSC's 40. VLR 46 is in electrical communication with MSC 40 and HLR 44. VLR 46 contains detailed data on location and service data regarding each subscriber entering its coverage area for routing which is used for incoming and outgoing calls. This allows MSC 40 to set up incoming and outgoing calls and is designed so information can be moved to MSC 40 to expedite call implementation. VLR 46 is a dynamic, but temporary, subscriber database, exchanging considerable amounts of data with its related HLR 44. Data stored in VLR 46 follows subscribers when they enter another VLR area.

IS-41 signaling links 45 are packet switched network links having either X.25 or SS7 type transport options. MSC queries HLR 44 after receiving the call setup message from the PSTN wireline network. During the querying, the call is suspended as its destination is unknown. As is known in the art, an authentication center (not shown) stores key information and security database information and is typically in communication with HLR 44.

Integrated Public/Private System

In order to identify a PBX subscriber in wireless network 14, it is necessary to map the subscriber's single PBX number to the Mobile Identification Number (MIN) and Electronic Serial Number (ESN) associated with his/her wireless handset 46. This mapping of PBX numbers to MINs is preferably contained in SCP/WLR 34/50, discussed further herein. HLR 4 also contains data indicating whether or not the subscriber is a PBX user so a call can be connected to the appropriate PBX switch 18 or SSP 30.

As is well-known in the art, the IS-41 architecture standard defines signaling, mobility control and handoff rules throughout wireless network 14. The IS-41 integration architecture supports the application layer communications between the wireless 14 and wireline 12 networks to implement the single-PBX-number service according to the present invention.

To achieve the desired wireless/wireline/PBX network interface and single-PBX-number service functionality contemplated according to the present invention, there is provided integrated wireless/wireline/PBX communication system 10 as shown in FIG. 1. Generally, the messaging and signaling functions are handled by SCP 34, and communicated to and from SCP 34 through STP 32, as shown in FIG. 3 more fully discussed herein.

As shown in FIGS. 1 and 3, in one embodiment, a wireline location register (WLR) database 50 is provided within SCP 34 (or otherwise in communication with SCP 34) in wireline network 12 to perform the various messaging functions according to the present invention heretofore attributed to SCP 34. For this reason, SCP 34 and WLR 50 will be designated herein as SCP/WLR 34/50. WLR 50 is a database preferably resident within Service Control Point (SCP) 34 of wireline network 12. The HLR-type-functionality of WLR 50 supports message exchange procedures enabling wireline network 12 to determine whether and when PBX subscribers become registered or become deactivated within wireless network 14. The VLR-type-functionality enables WLR 50 to issue location request messages to HLR 44 to determine routing location information for PBX subscribers registered in wireless domain 14.

Thus, in accordance with the present invention, SCP/WLR 34/50 and HLR 44 communicate through STP 32 which are interconnected via signaling trunks and circuits and use messaging techniques and features known in the art to handle the single-PBX-number service mobility functions. This signaling communication between SCP/WLR 34/50 and HLR 44 minimizes (if not eliminates) upgrades to existing switches and leverages existing AIN SSP and SCP functionalities to integrate the disparate PBX and wireless networks through the wireline network in a unified manner to support single PBX number wireless call routing based upon current PBX subscriber location. It is noted that the IS-41 architecture can use a variety of transport options and configurations. As shown in FIG. 1 and referenced above, system 10 according to the present invention is used with existing wireline switches such as SSP 30 as described above.

SCP/WLR 34/50 eliminates unconditional querying of HLR 44 by wireline network 12 to determine registration status and routing information. PBX subscribers thereby receive service in both the wireless 14 and PBX 16 networks. Further, PBX subscribers are permitted to keep their existing PBX numbers, which are mapped to a corresponding, and preferably, unlisted wireless Mobile Identification Number (MIN) when the PBX subscriber is wireless registered. Calls incoming to the PBX subscriber's number will thus not ring at the PBX subscriber's handset 20 while the associated wireless mobile unit 42 of the PBX subscriber is registered within wireless domain 14.

In operation SCP 34 has stored therein—or provides a database such as WLR 50 which has stored therein—data with regard to the single-PBX number service according to the present invention. Specifically, SCP/WLR 34/50 contains information including the single-PBX number belonging to each subscriber or extension of the single-PBX number service, the Mobile Identification Number (MIN) or ESN (electronic serial number) corresponding to each subscriber's single-PBX number and its associated wireless handset, and information as to whether the subscriber (or his/her handset) is currently registered in the wireless network. Thus, as will be discussed further herein, SCP/WLR 34/50 is queried (or accessed) to find out if a single-PBX number service subscriber is registered in the wireless network, and if so, what the corresponding MIN is in order to direct a call thereto under the desired circumstances. It is contemplated that the information and data contained in SCP/WLR 34/50 may also be contained in any database in association with SCP 34 having the space and capability to handle such information.

According to the teachings according to the present invention, single-PBX-number functions supported by the wireless/wireline service logic program must support the following wireless/wireline internetworking functions: Location determination; DN/MIN Call Mapping; Call Routing; and Services Synchronization.

Generally, SSP 30 is connected to MSC 40 by trunk circuits 28, while wireless components such as MSC 40, HLR 44 and VLR 46 are connected with each other and STP 32 by Is-41 Mobile Application Part (MAP) protocols 45 operating over SS7 or X.25 networks. IS-41 signaling links are packet switched networks, having either X.25 or SS7 type transport options. HLR 44 and VLR 46 may also connect to STP 32 by SS7 links 28.

Operation

Figure 2:
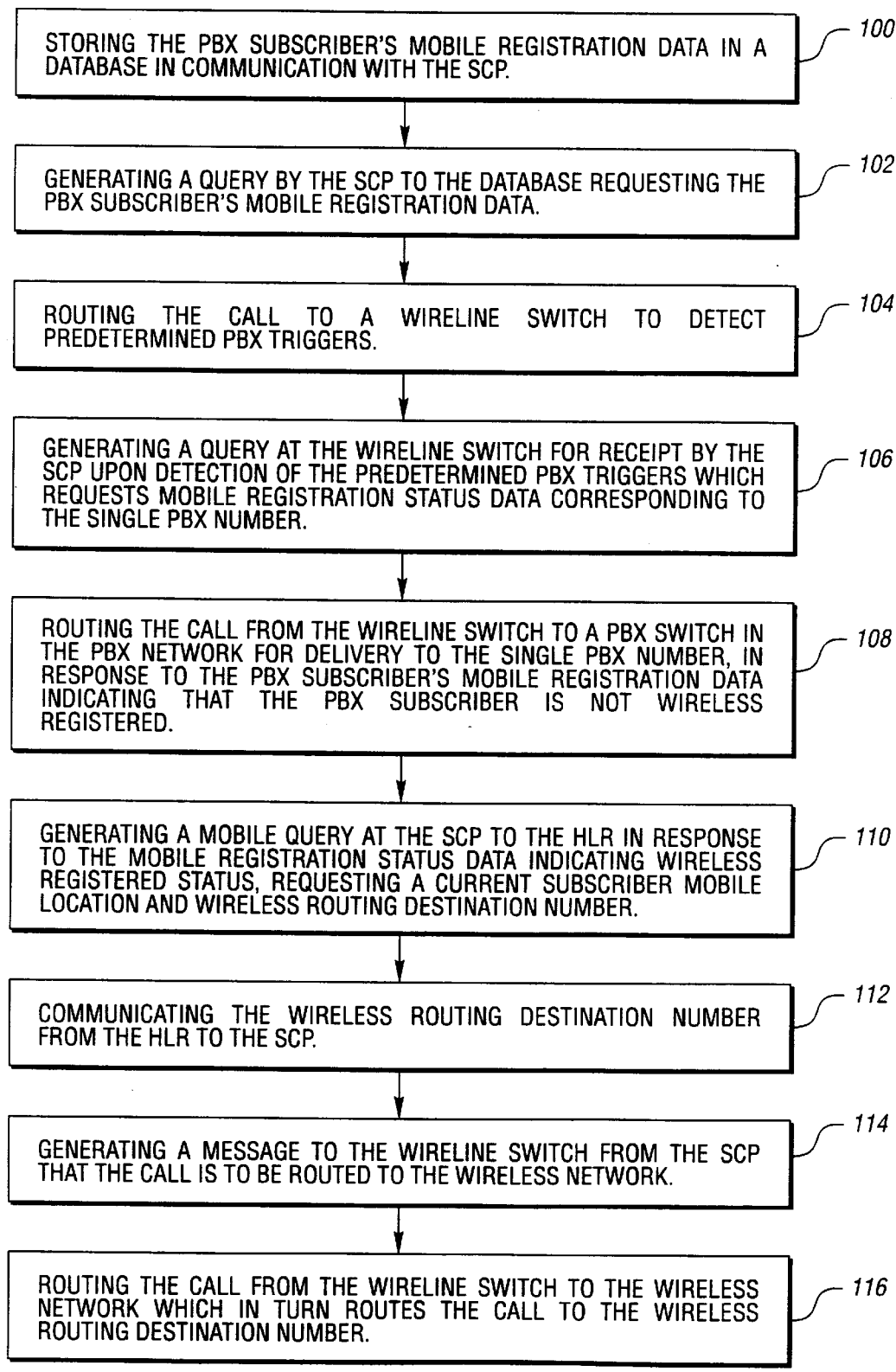
FIG. 2 is a block diagram of a method according to the present invention.

With reference now to FIG. 2 of the drawings, the method of operation according to the present invention and, in particular, the interfacing functionality will be described in greater detail. As shown in FIG. 2, a method according to the present invention is for routing a call directed to a single Private Branch Exchange (PBX) network telephone number from outside of the PBX network based on a PBX subscriber's location in the PBX or wireless networks. The method includes the step of storing the PBX subscriber's mobile registration data in a database in communication with the wireline SCP, as shown in block 100. Also, a query is generated by the SCP to the database requesting the PBX subscriber's mobile registration data, as shown in block 102. The call is routed to a wireline switch to detect predetermined PBX triggers, as shown in block 104. Also in this method, a query is generated at the wireline switch for receipt by the wireline service control point (SCP) upon detection of the predetermined PBX triggers, as shown in block 106. It is noted that the query requests mobile registration status data corresponding to the single PBX number.

Also in this method as shown in block 108, the call is routed from the wireline switch to a PBX switch in the PBX network for delivery to the single PBX number. This is in response to the PBX's subscriber mobile registration data indicating that the PBX subscriber is not wireless registered. Further, a mobile query is generated at the wireline service control point to the Home Location Register (HLR) of the wireless network in response to the subscriber mobile registration status data indicating that the subscriber is wireless registered, as shown in block 110. Again, it is noted that the mobile query requests a current subscriber mobile location and wireless routing destination number. The wireless routing destination number is communicated from the HLR to the wireline SCP, as shown in block 112, and a message to the wireline switch from the wireline SCP is generated that the call is to be routed to the wireless network, as shown in block 114. Further the call is routed from the wireline switch to the wireless network which in turn routes the call to the wireless routing destination number, as shown in block 116. Thus, the call is completed.

Further provided herein is a description of a call flow operable to perform various functions contemplated for the system and methods disclosed above in accordance with the present invention. In particular, the location determination, mapping, call routing and synchronization functionalities necessary to support the network interface will be described in further detail. As reference is made to FIG. 3, it is noted that queries and affirmative messages are generally designated by all uppercase letters, while query and message responses are generally shown in lowercase letters.

Location Determination

The location determination functionality according to the present invention represents the interworking functions between wireline 12, wireless 14, and PBX 16 networks responsible for the exchange of mobile subscriber registration and location information. For example, if the PBX subscriber's mobile unit 42 registers for wireless operation as previously stated, wireline network 12 must be capable of determining, through location status information exchange, that the PBX subscriber is presently reachable through wireless network 14 prior to handing the call off to PBX network 16. In such cases, all single-PBX-number call terminations must be mapped to an appropriate wireless MIN/mobile unit 42. Likewise when mobile unit 42 is deactivated or unregistered, wireline network 12 must be capable of determining, through location status information exchange, that all single-PBX-number calls should be directed or re-mapped to the single-PBX-number. Such location determination may be achieved through the Registration Notification process or the Location Request message, as is known in the art. Either is sufficient to achieve the goals and objectives of the present invention according to the teachings disclosed herein.

Note that, in one location determination method, the IS-41 protocols and messages (e.g. IS-41 Rev. C, LOCATION_REQUEST, etc.) can be used as a basis to implement location status information exchange between HLR 44 and SCP/WLR 34/50 via STP 32. To implement the single-PBX-number service, location status information for PBX subscribers must be maintained by and synchronized between both the wireless 14 and wireline 12 networks. IS-41 protocol allows wireline network 12 an efficient way to determine whether a mobile unit 42 associated with single PBX number subscriber is registered within wireless domain 14.

In another method, the procedure involved in registering mobile unit 42 in wireless network 14 is generally known in the art and involves messaging that is communicated between a mobile handset 42, its base station controller 41 or base station 43 and the corresponding MSC 40. Generally, a subscriber turns on his or her mobile unit 42 (not defined by IS-41) within proximity of MSC 40. MSC 40 sends a Registration Notification ("REGNOT") message to its corresponding VLR 46, which in turns forwards it, either directly or indirectly, to HLR 44 indicating that the subscriber has become wireless registered in wireless network 14.

Upon receiving the "REGNOT" message, HLR 44 forwards a Registration Notification Response ("regnot response") back to VLR 46 which in turn forwards it to MSC 40. Upon successfully registering, HLR 44 relays the REGNOT message to SCP/WLR 34/50 indicating that the PBX subscriber has transitioned from wireline network 12 to the PBX subscriber's mobile unit 42/MIN of wireless network 12. Upon receiving the message, WLR 50 sets the single PBX number subscriber as wireless registered, and returns a "regnot response" message to HLR 44. REGNOT stimulates database SCP/WLR 34/50 to route all subsequent calls directed to the PBX single number to wireless domain 14, as long as the PBX subscriber remains wireless registered.

In deactivating a wireless subscriber from wireless network 12, when the wireless registered PBX subscriber deactivates mobile unit 42, the deactivation is detected by MSC 40. MSC 40 then transmits a Mobile Service Inactive ("MSINACT") message to VLR 46 indicating the deactivation which in turn forwards this message to HLR 44. Upon receiving the message, HLR 44 returns a Mobile Service Inactive Response ("msinact response") to VLR 46 which in turn returns it to MSC 40. Meanwhile, HLR 44 sends MSINACT to SCP/WLR 34/50 indicating that the subscriber is no longer active in wireless network 14 and that wireline network 12 must now deliver calls directed to the single PBX number subscriber calls to the PBX subscriber's handset or extension 20 in PBX network 16. Lastly, a "msinact response" is returned to HLR 44 from SCP/WLR 34/50.

Call Mapping and Routing

Mapping provides the PBX subscriber having a single assigned number with the capability to map a call directed to a single PBX number in the PBX network to a wireless mobile unit 42/MIN, for purposes of call delivery to the PBX subscriber who is currently located and registered within wireless network 14. Note that the MIN may be treated as an unpublished number in the single-PBX-number service because, according to the teachings of the present invention, a calling party need only dial the PBX number associated with the PBX subscriber (and not the MIN) in order to reach the PBX subscriber in whatever domain he/she may be present. Furthermore note that the reverse mapping (MIN to PBX number) is required in order to relate wireless usage and charges to the PBX network carrier.

Wireless/PBX call routing delivers single-PBX-number calls to the appropriate wireless 14 or PBX 16 network based upon current PBX subscriber location information. The wireless/PBX call routing decision is made based upon location status information maintained within SCP 34, and in one embodiment, the WLR database 50 of SCP 34, as previously described. Note that since MIN's are expected to be an unpublished number, wireless network 14 may or may not expected to perform call termination based upon MIN's. To this end, wireless network 14 can be prohibited from performing MIN call terminations to ensure that wireline network 12 maintains call termination control over the PBX call before it enters the PBX network. The wireless/PBX call routing function is performed by AIN/SCP service logic using registration status information stored within WLR 50. The routing function is performed before a call in handed off to the PBX network which otherwise has no mechanisms in place for handing the call back to the wireline network or its local SSP for further processing.

If a PBX subscriber is wireless registered as previously discussed, the PBX subscriber is located (or subscriber's mobile unit 42 is active) in wireless network 14 and all PBX call terminations are mapped to a corresponding MIN and delivered through wireless network 14. If a PBX subscriber is not wireless registered but is instead within the PBX network coverage area 16, all PBX call terminations must be delivered through wireline network 12 to PBX 16. According to the present invention, mapping responsibility is distributed between both wireline 12 and wireless 14 networks. Note that this network distribution approach is preferably the most efficient architecture to implement wireless/wireline/PBX MIN/PBX-number address mapping. This is because internetwork number translations can be made by direct look-up to databases without searching.

FIG. 3 illustrates the call flow when a call incoming to a single number PBX subscriber is complete to PBX subscriber's mobile unit 40 registered in wireless network 14. Referring to FIG. 3, a calling party (CgP) calling from telephone 48 dials a PBX number (NPA-NXX-XXXX) belonging to the single PBX number service subscriber (typically assigned to handset 20). The call which is received by local switch SSP 30 assigned to PBX network 16 for handling (shown as 60). A call is routed generally to the closest SSP 30 providing access to PBX network 16. SSP 30 interrupts the digits and monitors them for detection of predetermined PBX triggers. This triggering detection may be performed in a number of ways in order to recognize that the called number is a PBX number, whether through recognition of a PBX prefix (NNX), a particular 10 digit number designated as a PBX number, or other ways known in the art. Whereupon SSP 30 issues an Info Analyzed query to SCP 34 through STP 32 (shown as 62 and 64). This query is received by SCP/WLR 34/50 which determines that the subscriber is wireless registered (as discussed above), and issues a Location Request Query ("LOCREQ") to HLR 44, again via STP 32, to determine the location (a wireless routing number or address) for the PBX subscriber (shown as 66 and 68).

In keeping with the present invention, upon receipt of LOCREQ, HLR 44 issues a "locreq" message response back to SCP/WLR 34/50 (through STP 32) containing a MIN Temporary Location Destination Number (TLDN) for routing the call to the wireless registered subscriber (shown as 70 and 72). SCP 34 returns an Analyze Route response to SSP 30 through STP 32 containing MIN TLDN as the routing number (shown as 74 and 76). SSP 30 routes the incoming call to the TLDN at MSC 40 (shown as 78). MSC 40 initiates paging and alerts the wireless registered single-number PBX subscriber (the called party CdP) at mobile unit 42 of the routed call. The PBX subscriber answers the incoming call at mobile unit 42 and the call connection is established with the calling party from telephone 38 (shown as 80). It is contemplated for call which terminate at mobile unit 42 according to the present invention disclosed herein, that a plurality of wireless mobile units 42 may be provided which correspond to a single-number PBX subscriber, each unit 42 having a common or unique MIN. In that case, each of the plurality of units 42 is alerted and the call is terminated to a one of the plurality of mobile units 42 which first answers the call.

Referring again to FIG. 3, provided is call flow diagrams for a call complete to a single-number PBX subscriber who is either not registered in the wireless network (as described above) or is busy on an active call. As shown in FIG. 3, calling party 38 dials the PBX number (NPA-NXX-XXXX) for the single-number PBX user, which is received by local switch SSP 30 for handling (shown as 60). SSP 30 interrupts the digits which are monitored for the detection of predetermined PBX triggers, as previously mentioned. Whereupon SSP 30 issues an Info_Analyzed query to STP 32 (shown as 62) which forwards it to SCP 34 (shown as 64) which in one embodiment is in communication with WLR 50. SCP/WLR 34/50 receives this query, determines that the subscriber is wireless registered (as discussed above), and issues a Location Request Query ("LOCREQ") to HLR 44 via STP 32 to determine the location (a wireless routing number or address) for the subscriber (shown as 66 and 68).

If the single-number PBX user is either not wireless registered or is busy on an active call, HLR 44 returns a location request response "locreq" for the subscriber who is on a mobile unit which does not have call waiting, voice mail, or another service which would allow the call to be completed at the mobile unit (also shown as 82). Thus, HLR 44 will send to WLR 50 (through STP 32) a "locreq response" containing an access denied indicator (ACCDEN) due to either a busy status or an inactive status for a mobile unit 42 which has inactive call delivery (shown as 82 and 84). SCP 34 returns a Continue message to SSP 30 instructing SSP 30 to send the call to the originally dialed single PBX number (i.e. use the originally dialed single PBX number as the terminating number) (shown as 86 and 88). SSP 30 hands off the call directed to the PBX number to PBX switch 18 (shown as 90) which in turn routes the single-number call to PBX station 20 (shown as 92) served by switch 18, where the PBX user/subscriber answers the incoming call at PBX station 20. Accordingly, call connection is established between the calling party as 38 and the PBX subscriber at station 20 (shown as 94).

As those skilled in the art will recognize, the above discussion is one possible solution for when a call delivered to a PBX subscriber's mobile unit 42 goes unanswered, in accordance with the present invention. Of course, a PBX subscriber may have mobile service which includes features for allowing the call to be completed in wireless network 14 instead of returning it to PBX network 16. Such features include call waiting (which contemporaneously would alert the subscriber of an incoming call while on a first call) or voice mail (which would complete the call to a mobile unit's voice mail box for taking a message).

Thus, according to the teachings according to the present invention, calls directed to private PBX networks—which do not have the ability to access the public wireline network, the wireline AIN architecture, or the wireless network—may be processed prior to delivery to the PBX network in order to provide the appearance of a seamless and integrated PBX/wireless network. As disclosed, this integrated network accommodates a single-PBX-number service which allows calls directed to a single PBX number to be routed to a mobile number which corresponds to the subscribers's single-PBX number.

Services Synchronization

Seamless services synchronization requires that service parameter changes made in wireless network 14 must be reflected within wireline network 12 and PBX network 16, and vice versa. The IS-41 protocol and messages for feature related treatment (FEATREQ) can be used as a basis to implement wireless/wireline service synchronization between the wireless network (HLR) and the wireline network (SCP/WLR).

Those skilled in the art will recognize that while SCP 34 and HLR 44 may, in practice, be combined on the same machine for efficiency, they still retain their respective functionality according to the networks which they service.

While the best mode for carrying out the invention has been described in detail, those familiar with the art to which this invention relates will recognize various alternative designs and embodiments for practicing the invention as defined by the following claims.

What is claimed is:

1. A method for routing a call directed to a single Private Branch Exchange (PBX) network telephone number from outside of the PBX network based on a PBX subscriber's location in the PBX or wireless networks, the method comprising:

routing the call to a wireline switch to detect predetermined PBX triggers;

generating a query at the wireline switch for receipt by a wireline service control point (SCP) upon detection of the predetermined PBX triggers, the query requesting mobile registration status data corresponding to the single PBX number;

routing the call from the wireline switch to a PBX switch in the PBX network for delivery to the single PBX number in response to the PBX's subscriber mobile registration data indicating that the PBX subscriber is not wireless registered;

generating a mobile query at the wireline SCP to a Home Location Register (HLR) of the wireless network in response to the subscriber mobile registration status data indicating that the subscriber is wireless registered, the mobile query requesting a current subscriber mobile location and wireless routing destination number;

communicating a wireless routing destination number from the HLR to the wireline SCP;

generating a message to the wireline switch from the wireline SCP that the call is to be routed to the wireless network; and routing the call from the wireline switch to the wireless network which in turn routes the call to the wireless routing destination number.

2. The method of claim 1 further comprising:

storing the PBX's subscriber's mobile registration data in a database in communication with the wireline SCP; and generating a query by the wireline SCP to the database requesting the PBX subscriber's mobile registration data.

3. The method of claim 2 further comprising updating the PBX's subscriber's mobile registration data in the database as such mobile registration data is received from the HLR.

4. The method of claim 1 further comprising generating a query by the wireline SCP to a database in communication with the wireline SCP requesting the PBX subscriber's mobile registration data.

5. The method of claim 1, wherein routing the call from the wireline switch to the wireless network includes sending the call to a plurality of wireless destinations, whereby the call is delivered to the first wireless destination answering the call.

6. The method of claim 1, wherein the wireless routing destination number is a Temporary Local Directory Number (TLDN).

7. A method for providing a call directed to a number in a Private Branch Exchange (PBX) network with Advanced Intelligent Network call processing features, the method comprising:

routing the call through a wireline switch to detect the existence of at least one predetermined PBX trigger indicating that the call is directed to the PBX network;

generating a query at the wireline switch to a Service Control Point (SCP) to determine a registered status in the wireless network of a wireless unit corresponding to the number in the PBX network;

if the registered status indicates that the wireless unit is registered, generating a query at the SCP to a Home Location Register (HLR) of the wireless network to request the location of the wireless unit;

communicating a response from the HLR to the SCP providing the location of the wireless unit;

communicating the response from the SCP to the wireline switch; and routing the call from the wireline switch to a mobile switching center in the wireless network serving the location of the wireless unit for delivery to the wireless unit.

8. A method for providing an interface between a wireless and Private Branch Exchange (PBX) network for exchanging subscriber status information in order to map a call incoming to a PBX subscriber's number assigned to a subscriber's wireless mobile handset through a wireline network, the method comprising:

communicating wireless registration status data corresponding to the PBX subscriber's wireless mobile handset from a home location register (HLR) of the wireless network to a Service Control Point (SCP) of the wireline network;

storing in the SCP the wireline registration status data corresponding to the PBX subscriber's wireless mobile handset;

sending a subscriber current location request from the SCP to the HLR of the wireless network in response to the wireline registration data indicating that the PBX subscriber is wireless registered;

communicating a wireless routing destination number from the HLR to the SCP;

communicating the wireless routing destination number from the SCP to a Service Switching Point (SSP); and routing the call from SSP to a Mobile Switching Center of the wireless network for delivery to the wireless routing destination number.

9. The method of claim 8 wherein storing in the SCP the wireline registration status data includes storing the wireline registration status data in a wireline database in communication with the SCP.

10. A method for providing a single-PBX-number service adapted for use between the PBX and wireless network for exchanging network status information across the wireline network to route a call incoming to a single-PBX-number to either a PBX subscriber's PBX handset or corresponding wireless handset depending on the wireless registration status of the PBX subscriber, the method comprising:

communicating wireless registration data from a home location register (HLR) to a wireline location register (WLR) in communication with a wireline service control point (SCP), the wireless registration data indicating that the wireless handset is registered or un-registered in wireless network;

storing the wireless registration data in the WLR;

receiving the call at a wireline switch which determines that the call is directed to the single-PBX-number;

if the wireless registration data indicates the wireless handset is registered, communicating a location request query from the SCP to the HLR regarding the wireless routing destination data of the wireless handset in response to the SCP receiving an indication from the wireline switch of the call is directed to the single-PBX-number;

responding to the SCP by the HLR the wireless routing destination data of the wireless handset;

routing the call to the wireless routing destination number; and if the wireless registration data indicates that the wireless handset is un-registered, routing the call to the PBX handset.

11. The method of claim 10 further comprising updating the WLR based on a revised wireless registration data from the HLR.

12. The method of claim 10 further comprising generating a query from the wireless switch to the SCP requesting the wireless registration data.

13. The method of claim 10 further comprising generating a communication from the SCP to the wireline switch indicating whether to route the call to the PBX handset or the wireless handset.

14. A system which provides a call routing service for a call directed to a single Private Branch Exchange (PBX) number through a wireline switch to either a wireless handset in the wireless network corresponding to the single-PBX-number or to a PBX handset in the PBX network assigned to the single-PBX-number, the system comprising:

a database located in the wireline network and in communication with the wireline switch for storing single-PBX-number routing information and registration status data;

a Home Location Register (HLR) located in the wireless network and in communication with the database for storing and communicating to the database single-PBX-number routing information and registration status data; and a service control point (SCP) located in the wireline network and provided in communication with the database and the wireline switch, the SCP operable to retrieve the single-PBX-number routing information from the database and provide the single-PBX-number routing information to the wireline switch.

15. The system of claim 14 further comprising a signal transfer point (STP) located in the wireline network and in communication with the SCP, HLR and wireline switch operable to act as a gateway to forward communications between the HLR and SCP and the wireline switch and the SCP.

16. The system of claim 14, further comprising a Visitor Location Register (VLR) located in the wireless network and provided in communication with a mobile switching center for providing current routing information to the HLR.

17. The system of claim 16 further comprising a signal transfer point (STP) located in the wireline network and in communication with the SCP, HLR, VLR and wireline switch operable to act as a gateway to forward communication transfer point between the HLR and SCP, the VLR and HLR, and the wireline switch and the SCP.

18. A system for providing a single PBX-number service for routing a call from a wireline switch in a wireline network to a wireless handset or to a PBX handset corresponding to a PBX number, the system comprising:

a wireline switch for routing the call to either the wireless handset or PBX handset;

a Service Control Point (SCP) located in the wireline network and in communication with the wireline switch for storing and retrieving PBX number routing information and registration status data and for providing the PBX number routing information to the wireline switch;

a Home Location Register (HLR) located in the wireless network and in communication with the SCP for storing and communicating to the SCP PBX-number routing information and registration status-data; and a signal transfer point (STP) located in the wireline network and in communication with the SCP, the HLR and the wireline switch, the STP operable to forward communications between the HLR and the SCP and between the SCP and the wireline switch.

19. The system of claim 18 wherein the SCP includes a wireline location register database which stores the PBX-number registration status data.

20. The system of claim 18 wherein the wireline switch is an SS7 service switch point (SSP) operable to communicate with the SCP via Intelligent Network messaging.

* * * * *